UNITED STATES PATENT OFFICE.

FRANK MEYER, OF OURAY, COLORADO.

COMPOSITION OF MATTER AND PROCESS OF PRODUCING THE SAME.

1,129,109.  Specification of Letters Patent.  Patented Feb. 23, 1915.

No Drawing.   Application filed January 21, 1914.  Serial No. 813,584.

*To all whom it may concern:*

Be it known that I, FRANK MEYER, a citizen of the United States, residing at Ouray, in the county of Ouray and State of Colorado, have invented certain new and useful Improvements in Compositions of Matter and Processes of Producing the Same, of which the following is a specification.

My invention relates to a new composition of matter and to the process of producing the same, its primary object being to produce an improved fuel in the form of artificially prepared blocks, commonly known as briquets.

In producing the improved fuel, I use coal or coke dust together with a binding agent which consists of an extract of cactus in liquid form. This extract is obtained either by draining or tapping live cactus-plants or by reducing the plants to pulp and treating the same with boiling water, or if so desired, with cold water and steam. The liquid thus produced is thoroughly mixed with the coal or coke dust and subjected to pressure in suitable molds. The product is a fuel in briquet form which possesses many advantages over other fuels of the same type. The medullary matter of the cactus is in its natural state at once combustible and adhesive, and has moreover the property of increasing its adhesiveness when subjected to moisture and pressure. When produced in liquid form by either of the two methods hereinabove described, it uniformly permeates the entire mass of coal or coke dust with which it is mixed, each particle of the dust is thus surrounded and separated from the others by a coating of this glutinous combustible liquid, with the result that the briquets formed from the said mixture provide a fuel of a high degree of combustibility and one which is less brittle than the ordinary briquets at present on the market and which will retain its form in water to become harder than before when subsequently dried. This last named feature is of great importance when the briquets are used in damp climates.

The low cost at which the cactus plants may be obtained, and the simplicity of producing the binder therefrom, make it possible to place the briquets on the market at an expense far below that at which the ordinary briquets are manufactured, and inasmuch as the cactus plants are practically useless for other purposes, the production of my briquets does not take from the market any substance which might be used to better advantage as a food-article.

While my process is particularly adapted to be employed in the manufacture of briquets from coal or coke dust, it may be also effectively used to form concentrates-bricks for smelting purposes or to form blocks of fuel of other combustible matter, such as sawdust.

Having thus described my invention what I claim and desire to secure by Letters-Patent is:

1. As a new article of manufacture, a briquet formed of a combustible dust intermixed with a liquid extract of cactus plants.

2. As a new article of manufacture, a briquet formed of coal or coke dust intermixed with a liquid extract of cactus plants.

3. The process of concreting non-adhesive matter consisting in producing an extract of cactus plants, thoroughly intermixing the liquid with the said matter in a finely divided form, and forming the mixture into cakes of suitable size and shape.

4. The process of producing fuel consisting in producing an extract from cactus plants in liquid form, mixing the same thoroughly with coal or coke dust and forming the mixture into cakes of suitable size and shape.

5. The herein-described composition of matter consisting of coke or coal dust and an extract of cactus plants in liquid form, intermixed as described.

6. The herein described composition of matter consisting of a combustible dust and an extract of cactus plants in liquid form, intermixed as described.

7. The process of producing fuel consisting in mixing with a combustible dust, a liquid containing the medullary matter of cactus plants and forming the mixture into cakes of suitable size and shape.

8. The process of producing fuel consisting in mixing with a combustible dust, the liquid obtained by tapping or draining cactus-plants and forming the mixture into cakes of suitable size and shape.

9. As a new article of manufacture, a briquet formed of a combustible dust intermixed with the medullary matter of cactus plants.

10. As a new article of manufacture, a briquet formed of a combustible dust intermixed with the liquid obtained by tapping or draining cactus plants.

In testimony whereof I have affixed my signature in presence of two witnesses.

FRANK MEYER.

Witnesses:
A. L. ZRABOW,
R. A. SMITH.

Copies of this patent may be obtained for five cents each, by addressing the "Commissioner of Patents, Washington, D. C."